United States Patent
Kim et al.

(10) Patent No.: US 6,393,030 B1
(45) Date of Patent: May 21, 2002

(54) METHOD FOR MAXIMIZING CELLULAR CAPACITY IN MUTI-MEDIA CDMA SYSTEM

(75) Inventors: Kyung Soo Kim, Daejeon; Ki Seon Kim, Kwangju; Jee Hwan Ahn; Hun Lee, both of Daejeon, all of (KR)

(73) Assignee: Electronics and Telecommunications Research Institute, Daejon (KR)

( * ) Notice: Subject to any disclaimer, the term of this patent is extended or adjusted under 35 U.S.C. 154(b) by 0 days.

(21) Appl. No.: 09/137,712

(22) Filed: Aug. 21, 1998

(30) Foreign Application Priority Data

Oct. 23, 1997 (KR) .............................................. 97-54544

(51) Int. Cl.[7] .............................................. H04B 7/216
(52) U.S. Cl. ...................... 370/441; 375/147; 455/67.1; 370/342; 370/441
(58) Field of Search .............................. 370/441, 229, 370/230, 232, 233, 234, 235, 335, 342, 468, 479, 252, 231, 253, 320, 360, 363, 439; 375/130, 140, 142, 143, 147, 150, 152, 136; 455/450, 453, 63, 67.1, 69

(56) References Cited

U.S. PATENT DOCUMENTS

| | | | | |
|---|---|---|---|---|
| 5,857,147 A | * | 1/1999 | Gardner et al. | 455/67.1 |
| 5,884,174 A | * | 3/1999 | Nagarajan et al. | 455/436 |
| 6,094,428 A | * | 7/2000 | Bruckert et al. | 370/329 |
| 6,111,863 A | * | 8/2000 | Rostoker et al. | 370/335 |

OTHER PUBLICATIONS

Erlang Capacity for an Integrated Voice/Data DS–CDMA Wireless System with Variable Bit Rate Sources; Narayan B. Mandayam, Jack Holtzman, Sergio Barberis; 1995; pp. 1078–1082.

DS–CDMA reverse link channel assignment based on interference measurements; S.M. Shin and D.K. Sung; 1995; pp. 1897–1899.

The Grade of Service for Integrated Voice/Data Wireless DS–CDMA Networks; Ning Guo and Salvatore D. Morgera; 1994; pp. 1104–1110.

* cited by examiner

*Primary Examiner*—Seema S. Rao
*Assistant Examiner*—Phirin Sam
(74) *Attorney, Agent, or Firm*—Antonelli, Terry, Stout & Kraus, LLP

(57) ABSTRACT

A cellular capacity in a multimedia DS-CDMA system may be maximized by controlling a transmission rate of data calls. In a method for maximizing the cellular capacity, the total interference quantity is controlled by restraining the transmission rates of the respective data calls according to diminution factors of a linear, a parabola and a hyperbola; the transmission rate of the data call is increased in case a traffic load is small; and the transmission rate of the data call is decreased in case the traffic is overloaded, thereby more calls can be received and the number of subscribers having a service of voice and data calls in the CDMA circumstances may be allowed most suitably. In case a call of higher priority is newly received under a state that the data call of a high speed occupies a resource of a system for a long time, the transmission rate of the currently progressing data is controlled to receive the new call. Accordingly, the number of subscribers can be allowed at maximum by controlling the transmission rate of the data call so that more voice and data calls may be received within the CDMA system capacity.

9 Claims, 1 Drawing Sheet

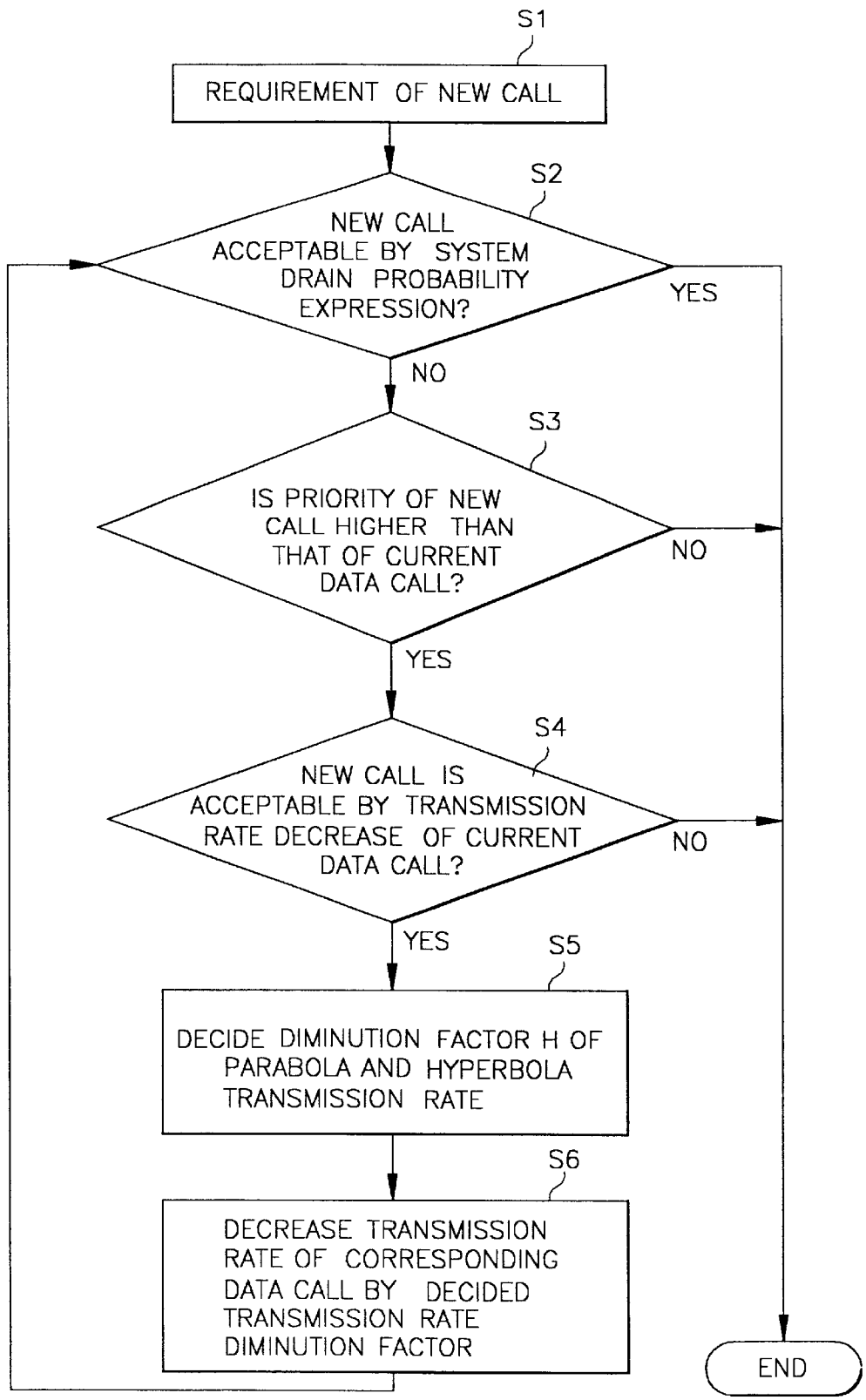

METHOD FOR MAXIMIZING CELLULAR CAPACITY IN MUTI-MEDIA CDMA SYSTEM

BACKGROUND OF THE INVENTION

1. Field of the Invention

The present invention relates to a method for maximizing a cellular capacity in a code division multiple access (hereinafter, referred to as "CDMA") system by controlling a transmission rate of data calls.

2. Description of Prior Art

In the CDMA system its capacity is decided by an interference caused in a data and voice traffic. Therefore it is important to restrain some unnecessary interference at maximum so as to gain an acceptable quality of service for voice.

In order to maintain a good service quality in the CDMA system, the total interference quantity caused in a communicative traffic should be lessened, in other words, a transmission quantity of information such as data and invoice calls from other subscribers should be reduced to obtain a good service, since the transmission quantity of other subscribers' calls becomes a source of the interference and the total interference quantity also increases systematically in proportion to the transmission rate of other subscribers' calls. Thereby the total interference quantity may be reduced.

By the way a transmission rate of data calls is changeable but a transmission rate of voice calls is not changeable, namely is fixed. The transmission rate of data calls may be thus an important considerable point in the system.

That is, in the data calls, in a case of a service in which a delay is permissible, a data transmission rate may be easily controlled to thereby restrict the interference quantity to a constant standard.

In specialty when a long data call occupies a resource of the system for a long time and in a state of an overload capacity at a cell of the system a voice call of which priority is higher than that of data call in a real time processing is received, a problem such as a cutoff of the call is caused. Accordingly an adequate management for the call is necessary.

In the conventional CDMA technique it was considered that all the voice and data calls were transmitted as a fixed transmission rate and under such consideration, a system capacity was computed, thus the transmission rate of the call caused the increasing of a difficulty in a receipt of a new call.

SUMMARY OF THE INVENTION

Accordingly, the present invention is directed to a method for receiving a new call that substantially obviates one or more of the limitations and disadvantages of the related art.

An object of the present invention is to provide a method for receiving a new call by controlling a transmission rate of a data call being under a service in case that a call having a higher priority is newly received under a state that a data call of a high speed occupying a resource of a system for a long time is being transmitted thereto.

Another object of the present invention is to provide a method for receiving more calls by controlling the total interference quantity in such a way as restraining a transmission rate of respective data calls according to diminution factors of a linear, a parabola and a hyperbola, in which the transmission rate of the data call is increased in case a traffic load is small and the transmission rate of the data call is decreased in a case of an overload in the traffic so that the number of subscribers having a service of voice and data calls in a CDMA circumstances may be allowed most suitably.

Additional features and advantages of the invention will be set forth in the description which follows, and in part will be apparent from the description, or may be learned by practice of the invention. The objectives and other advantages of the invention will be realized and attained by the structure as illustrated in the written description and claims hereof, as well as the appended drawings.

To achieve these and other advantages, and in accordance with the purpose of the present invention as embodied and broadly described, in a case of a data call, the maximum transmission rate is serviced if a load in a cellular capacity is small, and if the cellular capacity is an overload state, the transmission rate of data is lessened to thus match the total interference quantity to a target value in a service quality and receive a new call is received.

In the CDMA system, the capacity in a system for only a voice service is computed by modeling an interference of an outer cell user as a gaussian random variable with a means and a variance of a corresponding interference.

Similarly to this, an inference of an outer cell user under a multi-media circumstances can be modeled as a gaussian random variable in the following numerical expression 1, e.g.,

[Numerical Expression 1]

$$I = \int\int \left( \phi S_V \rho_v + \sum_{i=1}^{N-1} S_{d_i} \rho_{d_i} \right) \left(\frac{r_m}{r_0}\right)^d \{10^{(\xi_0 - \xi_m)}\} \phi\left\{\xi_0 - \xi_m \frac{r_0}{r_m}\right\} dA$$

where $r_o$ indicates a distance from a user of other cell to a target base station and $r_m$ represents a distance from that user to his own base station, m being an index of the base station.

In the above, $\phi$ indicates a voice action variable and has a binomial distribution with a mean $\alpha$, thus its numerical expression 2 may be gained as follows.

A path loss between a base station and a user is in proportion to $10^{\xi/10} r^{-4}$ and $\xi$ has a normal distribution with a mean is '0' and a standard variation is 8 dB.

$S_v$ presents supply power on voice calls and $S_a$ provides supply power for data calls.

$$\phi\left(\xi_0 - \xi_m \frac{r_0}{r_m}\right) = \begin{pmatrix} 1, \text{ if } \left(\frac{r_m}{r_o}\right)^d 10^{\frac{(\xi_0 - \xi_m)}{10}} \leq 1 \\ 0, \text{ otherwise} \end{pmatrix} \quad \text{[Numerical Expression 2]}$$

In the above numerical expression 1, $\rho_v$ is a user density of voice call and $\rho_a$ indicates a user density of a data call group I.

This is a case for an incomplete power control actually, and the interference I is described as a set of a unit random variable with a logarithmic normal distribution.

Accordingly, when we limit the service area to the second tier, under an assumption that it is impossible one more user exist at the some position, a mean and a variance of the interference from the outer cell user may be obtained through a numerical calculation by a voice call Nv and a data call $N_a$ as the following numerical expression 3, $$E(I) \leq 0.241 N_v S_v + \sum_{i=1}^{N-1} N_{d_i} S_{d_i} \qquad \text{[Numerical Expression 3]}$$

$$\text{Var}(I) \leq 0.078 N_v S_v^2 + 0.183 \sum_{i=1}^{N-1} N_{d_i} S_{d_i}^2$$

Further, if we define an SIR is a signal-to-interference ratio for considering an influence from a capacity of the outer cell user interference, a numerical expression 4 may be provided as follows, $$r_v N_v + \sum_{i=1}^{N-1} r_{d_i} N_{d_i} \leq 1 - z, \qquad \text{[Numerical Expression 4]}$$

where z may be obtained as follows, $$z = \frac{I}{S_v} \frac{1}{(SIR)^{-1} v_{requirred} + \alpha} = \frac{I}{S_{d_i}} \frac{1}{(sir)^{-1} d_{required} + 1}$$

therefore, a mean and a variance of the gaussian random variable z may be obtained by a numerical expression 5, e.g., $$E(z) \leq 0.659 r_v N_v + 0.659 \sum_{i=1}^{N-1} r_{d_i} N_{d_i} \qquad \text{[Numerical Expression 5]}$$

$$\text{Var}(z) \leq 0.555 r^2 v N_v + 0.183 \sum_{i=1}^{N-1} r_{d_i}^2 N_{d_i}$$

and a probability satisfing a required service in the system may be represented as the following numerical expression 6, e.g., $$P = P_r\{(E_b/N_0) \geq (E_b/N_0)_{required}\} \qquad \text{[Numerical Expression 6]}$$

$$= P_r\left\{r_v N_v + \sum_{i=1}^{N-1} r_{d_i} N_{d_i} \leq 1 - z\right\} \geq 0.99$$

An unequal expression such as the following numerical expression 7 can be obtained from the numerical expression 6 since z is the gaussian random variable with the mean and the variance such as the expression 5, $$r_v N_{v_i} + \sum_{i=1}^{N-1} r_d N_{d_i} + E(z) + 2.33 \sqrt{\text{var}(z)} \leq 1 \qquad \text{[Numerical Expression 7]}$$

where $E(z)$ and $Var(z)$ are a function of $N_{v_\lambda}$ and $N_{d_\lambda}$ as known in the numerical expression 7.

In comparison with a single cell circumstances, under a consideration that the total system resource is 1, a voice service user in this system requires more system resources than a system resources $r_v$ required in a case of the single cell. A data service user also requires more quantity than a system resources $r_{d_\lambda}$ required in a case of the single cell.

A transmission of all the packetized data, a re-transmission of all the error packet and voice call are defined as the services with equal class in this invention. That is, N−1=1 in the numerical expression 1. In addition, this invention is concerned about imperfect power controlled system.

The total interference ratio for a voice call per bit energy for deciding a capacity of a multi-media CDMA system may be obtained by the following expression 8, $$\left(\frac{E_b}{N_0}\right)_v = \left(\frac{E_b}{I_0}\right)_v \qquad \text{[Numerical Expression 8]}$$

$$= \frac{E_{b,v_0}/\eta_0}{1 + \frac{R_v}{W}\sum_{i=1}^{K_v} \alpha \frac{E_{b,v_i}}{\eta_0} + \frac{hR_d}{W}\sum_{i=1}^{K_d} \frac{E_{bd_i}}{\eta_0}}$$

wherein $\eta_o$ represents a power density of a background noise, and $I_o$ indicates the total interference, namely, $I_o = \eta_o + N_o = N_o$, and h means a decrease factor of transmission rate, and $K_v$ and $K_d$ meaning the number of subscribers are random variables. At this time a ratio of a signal-to-interference of a voice call should be higher than a given power, thus the following numerical expression 9 can be obtained, namely, $$\left(\frac{E_b}{I_0}\right)_v \geq r_v \qquad \text{[Numerical Expression 9]}$$

where $r_v$ means a limited value of a ratio of a given power. Herewith when T, β and S are defined, the following numerical expression 10 is obtained, $$\frac{E_b}{N_0} = X, \quad Y = 10\log\left(\frac{X}{10}\right) \qquad \text{[Numerical Expression 10]}$$

$$\beta_v = r_v \frac{R_v}{W}, \quad \beta_d = r_v \frac{R_d}{W}$$

$$S = \beta_v \sum_{i=1}^{K_v} \alpha \frac{E_{b,v_i}}{\eta_0} + \beta_d \sum_{i=1}^{K_d} h \frac{E_{b,d_i}}{\eta_0}$$

wherein X indicates a random variable with a logarithmic normal distribution and Y is a random variable with a normal distribution coinciding with X.

At this time, a system drain probability is defined as the following numerical expression 11, $$Pr\left[\left(\frac{E_b}{I_0}\right) < r_v\right] = 1 - f(\mu_s \cdot \sigma_s) \qquad \text{[Numerical Expression 11]}$$

wherein $f(\mu_s - \sigma_s)$ can be obtained as follows.

$$f(\mu_s \cdot \sigma_s) = \frac{2}{3} Q\left(\frac{10\log_{10}\left(\frac{r_v + \mu_s}{10}\right) - E[Y]}{\sqrt{\text{Var}[Y]}}\right) +$$

$$\frac{1}{6} Q\left(\frac{10\log_{10}\left(\frac{r_v + \mu_s + \sqrt{3}\sigma_s}{10}\right) - E[Y]}{\sqrt{\text{Var}[Y]}}\right) +$$

$$\frac{1}{6} Q\left(\frac{10\log_{10}\left(r_s + \mu_s - \frac{\sqrt{3}\sigma_s}{10}\right) - E[Y]}{\sqrt{\text{Var}[Y]}}\right)$$

In the above expression $\mu s$ and $\sigma_s^2$ may be also gained in the following expressions.

$$\mu_s = \beta_v \alpha m_v K_v + \beta_d h E[K_d] m_d$$

$$\sigma_s^2 = \beta_v^2 \alpha^2 K_v \sigma_v^2 + \beta_d^2 h^2 E[K_d](\sigma_d^2 + m_d^2)$$

In the above $m_v$ represents a mean of a voice call and $_d m$ indicates a mean of a data call. Inaddition, the variable S with Poisson distribution reaches, therefore, $\mu_A$ and $\sigma_s^2$ is a mean and a variance of a random variable S.

A imformation for permitting connection for data calls in a base station is updated every a packet period.

If the number of re-transmitted packets is j, the base station transmits itself j state to a mobile station. At this time, the mobile station decreases a arrival ratio of packet with a probability for Π' of which Π is a permit constant less than '1'.

Thus, under an assumption that a mean arrival rate for a data call packet is $\rho_d$, a effective mean arrival ratio for a data call in a re-transmission system becomes the following numerical expression 12, e.g., $$\frac{\rho_d}{(1-P_b)}$$ [Numerical Expression 12]

where $P_b$ represents a mean cutoff probability of the data call.

The number of packets to be permitted connection under the state of the base station is j may be defined as the following numerical expression 13, $$\rho_j = \frac{\rho_d}{1-P_b}\pi'$$ [Numerical Expression 13]

At this time the system can be modeled as a three dimensinal markov chain since it is a function of the number of voice calls, the number of data calls and the number of re-transmission packets.

A duration time of the data call is shorter than that of the voice call, that is, the number of the voice calls almost becomes a constant, hence a probability distribution of an equilibrium state may be obtained as the following expression 14 if the number of the data calls is represented as a function of a mean data arrival rate, e.g., $$P_j = \frac{\prod_{i=0}^{j-1}\alpha_i}{\prod_{i=0}^{j}(1-\alpha_i)}P_0$$ [Numerical Expression 14]

Herewith, a probability $\alpha_j$ means a system drain probability, and a mean and a variance for an arrived power of base station is as follows.

$\alpha_j \approx 1 - f(\mu_{s_j}, \sigma_{s_j})$ $\mu_{s_j} = \beta_v \alpha m_v K_v + \beta_d h \rho_j m_d$ $\sigma_{s_j}^2 = \beta_v^2 \alpha^2 K_v \sigma_v^2 + \beta_d^2 h^2 \rho_j (\sigma_d^2 + m_d^2)$ Accordingly, a cutoff probability may be defined as the following numerical expression 15.

$$P_b = 1 - \sum_{j=0}^{\infty} \pi^j P_j$$ [Numerical Expression 15]

The control method of variable transmission rate, when a traffic load increases, decreases a transmission rate of data call on the basis of the above numerical expression 11, thereby increasing the number of users in the system. Herein a decrease factor h of the transmission rate is dependent on a system load, and supposing that all data calls have the same transmission rate, the transmission rate factor h can be represented as a function of the number of re-transmission packets In case a system load is small, the maximum transmission rate is supported to, that is, the decrease factor may become '1'. In case a system is overloaded, the minimum decrease factor may be decided by a buffer size and the minimum transmission rate.

Accordingly, it is defined a transmission rate diminution factor h of linear, parabola and hyperbola functions based on the maximum buffer size or the minimum transmission rate in the system as the following numerical expression 16,

[Numerical Expression 16]

Linear: $oh(1)=1-1m$

Parabola: $h(1)=1-1^2m$

Hyperbola: $h(l) = \frac{1}{1+lm}$ wherein m indicates a control constant depending on to the system.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawing:

FIG. 1 represents a flow chart for receiving new calls by controlling a transmission rate of data calls being under a service in accordance with the present invention.

DETAILED DESCRIPTION OF PREFERRED EMBODIMENT

Reference will now be made in detail to the preferred embodiments of the present invention, examples of which are illustrated in the accompanying drawings.

FIG. 1 shows a flow chart for receiving new calls by controlling a transmission rate of data calls being under a service in accordance with the present invention. The following describes a process for accepting more calls by controlling a transmission rate of data calls.

In a step S1, if there is a requirement for a new call, it is checked in a step S2 whether the new call can be accepted on the basis of the numerical expression 11. At this time a transmission rate of a data call is computed as the maximum transmission rate.

In case the call receipt is acceptable by the numerical expression 11, the corresponding call is serviced.

Meanwhile, in case the new call can not be accepted, in a step S3 it is checked whether a priority of the new call is higher than that of the data call currently in service, and if higher, in a step S4 it is decided whether the corresponding call can be received by controlling a transmission rate of the data call currently in service.

After such decision, if the corresponding call can be accepted, in a step S5 a diminution factor h of linear, parabola and hyperbola transmission rates is decided by considering the maximum buffer size or the minimum transmission rate of the system. Then the transmission rate of the data call currently in service in the numerical expression 11 decreases by using the decided diminution factor, in a step S6, to thereby receive the new call.

However, in case a new call can not accept even though a transmission rate of a data call currently in service decreases to the minimum transmission rate, a corresponding new call is rejected.

Also, if a currently progressing call is completed so a new call can be accepted, a decreased transmission rate of the corresponding data call increases in a reverse direction of the transmission rate diminution factor h to increase the decreased transmission rate of the data call.

as afore-mentioned, the present invention controls a transmission rate of data calls to accept more voice and data calls within the CDMA system capacity, so that it accepts the maximum number of users.

It will be apparent to those skilled in the art that various modifications and variations can be made in the cellular capacity maximizing method of the present invention without deviating from the spirit or scope of the invention. Thus, it is intended that the present invention cover the modifications and variations of this invention provided they come within the scope of the appended claims and their equivalents.

What is claimed is:

1. A method for receiving a new call so as to maximize a capacity of a code divisional multiple access (CDMA) system wherein a base station communicates messages with a plurality of mobile subscribers, a call indicates a physical signal for communicating messages via voice or data in the system, a plurality of calls exist at an instant communicating between the base station and mobile subscribers, a currently progressing call indicates a data call existing at an instant, and the new call indicates an incoming call in addition to the currently processing call, said method comprising steps of:
    (a) providing a service with a maximum transmission rate for the data call in case that a load of the system is smaller than the system capacity when all calls are transmitted at a fixed rate; and
    (b) decreasing the transmission rate of the data in case the system is overload, maintaining a total interference quantity to a target value of service quality, and receiving the new call;
    wherein said step (a) comprises steps of:
        (a-1) checking whether the new call is acceptable by employing a system drain probability expression when the new call is required for a receipt; and
        (a-2) computing the maximum transmission rate of the data call through a use of the system drain probability expression and servicing the new call, in case the new call is acceptable.

2. The method of claim 1, wherein said step (b) comprises steps of:
    (b-1) detecting whether a priority of the new call is higher than that of the data call currently in service, in case the new call is not acceptable;
    (b-2) controlling the transmission rate of the currently progressing data call and deciding whether the new call can be allowed, in case that the priority of the new call is higher than the currently progressing data call in service;
    (b-3) deciding a diminution factor of linear, parabola and hyperbola transmission rates by considering a maximum buffer size or a minimum transmission rate of the system, in case the new call can be allowed;
    (b-4) decreasing the transmission rate of the currently progressing data call on the system drain probability expression by using the decided diminution factor and receiving the new call;
    (b-5) rejecting the new call in case that the new call is not acceptable even though the transmission rate of the currently progressing data call decreases to the minimum transmission rate; and
    (b-6) increasing a decreased transmission rate in a reverse direction of the transmission rate diminution factor, when the currently progressing data call is completed so the new call can be received systematically.

3. The method of claim 2, wherein said step (b) further comprises a step of rejecting the new call in case that the priority of the new call is not higher than the currently progressing data call.

4. The method of claim 2, wherein said step (b) further comprises a step of rejecting the new call in case that the new call cannot be received by controlling the transmission rate of the currently progressing data call in service.

5. A method for maximizing a capacity of a cellular system by controlling a transmission rate of a data call in service, said method comprising steps of:
    determining whether there is an incoming new call while servicing a current data call;
    determining whether the new call can be accepted on the basis of a system drain probability expression; and
    computing a maximum transmission rate of the data call currently in service, and servicing the new call, when the new call can be acceptable on the basis of said system drain probability expression.

6. The method of claim 5, further comprising:
    determining whether the new call has priority over the data call currently in service, when the new call can not be accepted on the basis of said system drain probability expression;
    determining whether the new call can be received for controlling the transmission rate of the data call currently in service, when the new call has priority over the data call currently in service;
    determining a diminution factor of linear, parabola and hyperbola transmission rates by considering a maximum buffer size or a minimum transmission rate of the cellular system, when the new call can be received; and
    controlling the transmission rate of the data call currently in service using said diminution factor of linear, parabola and hyperbola transmission rates in order to receive the new call.

7. The method of claim 6, wherein the transmission rate of the data call currently in service is decreased to the minimum transmission rate by said diminution factor of linear, parabola and hyperbola in order to receive the new call.

8. The method of claim 7, wherein, if the data call currently in service is completed, the transmission rate increases in a reverse direction based on said diminution factor of linear, parabola and hyperbola in order to receive the new call.

9. The method of claim 7, wherein the new call is rejected when the priority of the new call is not higher than the data call currently in service.

* * * * *